US012688144B2

(12) United States Patent
   Huang

(10) Patent No.: US 12,688,144 B2
(45) Date of Patent: Jul. 21, 2026

(54) DATA PROCESSING METHOD AND APPARATUS

(71) Applicant: Lenovo (Beijing) Limited, Beijing (CN)

(72) Inventor: Zunpo Huang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/892,004

(22) Filed: Sep. 20, 2024

(65) Prior Publication Data

US 2025/0103542 A1     Mar. 27, 2025

(30) Foreign Application Priority Data

Sep. 21, 2023  (CN) .......................... 202311233360.1

(51) Int. Cl.
*G06F 13/00*       (2006.01)
*G06F 13/42*       (2006.01)

(52) U.S. Cl.
CPC .. *G06F 13/4282* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 2013/0097413 A1* | 4/2013 | Wu | ........................ | G06F 1/3203 |
| | | | | 713/2 |
| 2015/0334109 A1* | 11/2015 | Kasai | .................... | G06F 3/1236 |
| | | | | 358/1.14 |
| 2019/0265981 A1* | 8/2019 | Yakame | .................. | G06F 1/263 |
| 2020/0394300 A1* | 12/2020 | Harris | .................. | G06F 21/575 |
| 2022/0197529 A1* | 6/2022 | Sealing | ................. | G06F 3/0622 |
| 2023/0216775 A1* | 7/2023 | Xu | .......................... | H04L 45/52 |
| | | | | 370/392 |

\* cited by examiner

*Primary Examiner* — Henry Tsai
*Assistant Examiner* — Dean Phan
(74) *Attorney, Agent, or Firm* — ANOVA LAW GROUP, PLLC

(57)            ABSTRACT

A data processing method, applied to a management system, includes enabling target modules of a target system, collecting operation data of at least one sub-module in the target system according to a first target path in response to the target system being in a successful startup status, sorting the collected operation data according to the startup time to obtain a target dataset, and outputting the target dataset. Each target module of the target modules is an operation module for starting the target system. Each sub-module of the at least one sub-module is configured to run a part or all of a program of a target module to which the sub-module belongs. The first target path at least includes a USB over LAN. The operation data is at least used to represent startup time of the sub-module.

19 Claims, 3 Drawing Sheets

DATA PROCESSING METHOD AND APPARATUS

CROSS-REFERENCE TO RELATED APPLICATION

The present disclosure claims priority to Chinese Patent Application No. 202311233360.1, filed on Sep. 21, 2023, the entire content of which is incorporated herein by reference.

TECHNICAL FIELD

The present disclosure relates to the data collection technology field and, more particularly, to a data processing method and a data processing apparatus.

BACKGROUND

During the startup process of a system, startup time may be too long due to an abnormality of a certain startup module, which affects the operation efficiency of the system. To determine an internal cause of the long startup time for the system, a technician needs to manually troubleshoot internal assemblies of the system in sequence and collect operation data of each module in sequence during the troubleshooting process. However, startup processes of the modules take a long time, and the amount of the operation data is large. Thus, it takes a long time for the technician to troubleshoot, which affects the processing efficiency of the system.

SUMMARY

The present disclosure provides a data processing method. The method applied to a management system includes enabling target modules of a target system, collecting operation data of at least one sub-module in the target system according to a first target path in response to the target system being in a successful startup status, sorting the collected operation data according to the startup time to obtain a target dataset, and outputting the target dataset. Each target module of the target modules is an operation module for starting the target system. Each sub-module of the at least one sub-module is configured to run a part or all of a program of a target module to which the sub-module belongs. The first target path at least includes a USB over LAN. The operation data is at least used to represent startup time of the sub-module.

The present disclosure provides a data processing apparatus, applied to a management system and including an enablement unit, a data collection unit, a sorting unit, and a data output unit. The enablement unit is configured to enable target modules of a target system. Each target module of the target modules is an operation module for starting the target system. The data collection unit is configured to collect operation data of at least one sub-module in the target system according to a first target path in response to the target system being in a successful startup status. Each sub-module of the at least one sub-module is configured to run a part or all of a program of a target module to which the sub-module belongs. The first target path at least includes a USB over LAN. The operation data is at least used to represent startup time of the sub-module. The sorting unit is configured to sort the collected operation data according to the startup time to obtain a target dataset. The data output unit is configured to output the target dataset.

The present disclosure provides a non-transitory computer-readable storage medium storing programs that, when executed by one or more processors, cause the one or more processors to enable target modules of a target system, collect operation data of at least one sub-module in the target system according to a first target path in response to the target system being in a successful startup status, sort the collected operation data according to the startup time to obtain a target dataset, and output the target dataset. Each target module of the target modules is an operation module for starting the target system. Each sub-module of the at least one sub-module is configured to run a part or all of a program of a target module to which the sub-module belongs. The first target path at least includes a USB over LAN. The operation data is at least used to represent startup time of the sub-module.

DETAILED DESCRIPTION OF THE EMBODIMENTS

The technical solutions of embodiments of the present disclosure are described in detail in connection with the accompanying drawings of embodiments of the present disclosure. Described embodiments are merely some embodiments of the present disclosure, not all embodiments. Based on embodiments of the present disclosure, all other embodiments obtained by those skilled in the art without creative efforts are within the scope of the present disclosure.

In the present disclosure, relational terms such as first and second are merely used to distinguish one entity or operation from another entity or operation and do not necessarily imply any actual relationship or order between these entities or operations. The terms "include," "comprise," or any other variants are intended to cover non-exclusive inclusion, so that a process, method, article, or device that includes a series of elements not only includes those elements, but can also include other elements not explicitly listed, or elements inherent to such the process, method, article, or device. Without further limitations, an element defined by the phrase "including a . . . " does not exclude the existence of an additional identical element in the process, method, article, or device that includes the element.

The present disclosure can be used in many general-purpose or special-purpose computing apparatus environments or configurations, e.g., personal computers, server computers, handheld or portable devices, tablet devices, multiprocessor apparatuses, and distributed computing environments that include any of the above apparatuses or devices.

Figure 1:
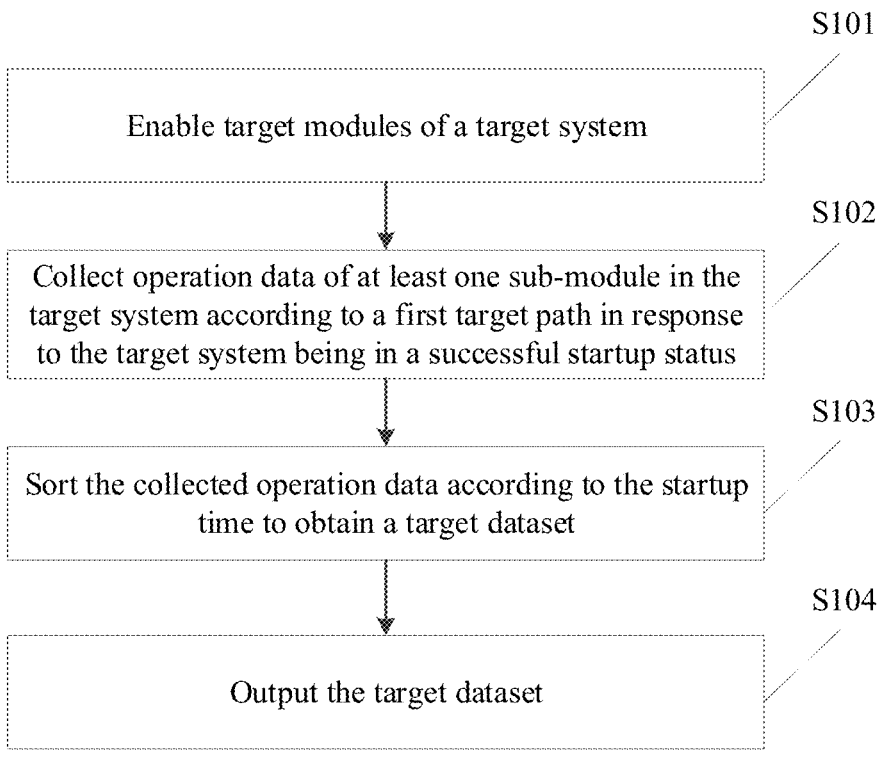
FIG. 1 illustrates a schematic flowchart of a data processing method according to some embodiments of the present disclosure.

The present disclosure provides a method. The method can be applied to a plurality of system platforms. An execution body can be a management system. FIG. 1 illustrates a schematic flowchart of the method according to some embodiments of the present disclosure. The method includes the following processes.

At S101, target modules of a target system are enabled.

The target module can be an operation module configured to start the target system.

The target system can be connected to the management system via USB over LAN. The management system can send an enable signal to the target system via USB over LAN to enable target modules of the target system. A target module can operate a program belonging to the target module according to normal startup steps to complete the initialization of the target system.

In the present disclosure, the target modules included in the target system can include a Boot Loader (data load module), a Kernel Init (kernel startup module), and a Userspace Init (user space startup module). During the startup process of the target system, the target modules can run the programs belonging to the target modules in sequence. The operation order of the target modules can be after the operation of the Boot Loader is completed, the Kernel Init starts to operate, and then the Userspace Init starts to operate. After the successful operation of the Userspace Init, the startup of the target system is completed.

At S102, when the target system is in a successful startup status, operation data of at least one sub-module of the target system is collected according to a first target path.

The sub-module can be configured to operate a part or all of the program of the target module, to which the sub-module belongs. The first target path can at least include a USB over LAN. The operation data (profiling data) can be at least used to indicate startup time of the sub-module.

In the present disclosure, when the Userspace Init in the target system starts successfully, the target system can be in a successful startup status. The management system can detect the operation statuses of the target modules in the target system via a USB over LAN. When the operation status of the Userspace Init is detected to represent successful startup, the target system can be represented to be in the successful startup status.

During the startup process of the target system, if any one of the target modules starts successfully, the operation data of the sub-modules in the target module can be written into the corresponding storage device. The management system can collect the operation data in the storage device according to the first target path.

At S103, collected operation data is sorted according to the startup time of the operation data to obtain a target dataset.

The target dataset can include the operation data of all sub-modules in the target system. The operation data in the target dataset can be sorted in descending order of startup time. When the startup time of a submodule is longer, the possibility is higher for the module to have abnormality. By sorting the operation data according to the startup time during the troubleshooting, an abnormal module can be quickly determined to maintain and process the abnormal module.

At S104, a target dataset is outputted.

In some embodiments, after obtaining the target dataset, the target dataset can be outputted on a pre-configured display device to display operation data of the target dataset on the display device or output the target dataset based on a data query sent by any terminal.

In the method of embodiments of the present disclosure, the management system can send the enable signal to the target system via a USB over LAN to enable the target modules in the target system. If the Userspace Init of the target system is detected to successfully start, the system can be determined to be in the successful startup status. After the target system successfully starts, the operation data of at least one sub-module of the target system can be collected according to the first target path, and the collected operation data can be sorted according to the startup time of the operation data to obtain and output the target data.

In the present disclosure, the management system can be connected to the target system via a USB over LAN. The management system can be configured to enable the target system to collect the operation data of the target system. Thus, the operation data of the target system can be automatically collected and outputted, which saves the processing processes for the operation data and improves the processing efficiency of the system.

In embodiments of the present disclosure, during the startup process of the target system, the three target modules of the Boot Loader, Kernel Init, and Userspace Init can start in sequence. After the three target modules start successfully, the operation data of the sub-modules during the startup process can be written into the memories corresponding to the three target modules. In the target system, since the priorities of the Kernel Init and Userspace Init are higher than the Boot Loader, the internal memory of the target system can be mainly used to store the operation data of the Kernel Init and the Userspace Init. Thus, when the memory of the target system cannot store all operation data of the three target modules, the operation data of the Kernal Init and the Userspace Init that is subsequently written into the memory can overwrite the operation data of the Boot Loader.

To prevent the operation data of the Boot Loader from being overwritten by the operation data of the Kernel Init and the Userspace Init, after the Boot Loader successfully starts, the operation data can be written into the memory of the management system.

In some embodiments, the management system receiving the operation data written by the Boot Loader can include, in response to a data transfer command corresponding to a data load module in the target system, obtaining the operation data of the sub-module of the data load module sent by the data load module through a first serial port. The operation data of the sub-module in the data load module can be stored in the memory of the management system.

After the Boot Loader (data load module) successfully starts, the Boot Loader can proactively send the data transfer command to the management system. In response to the data transfer command, the management system can send the operation data through the first serial port. The management system can store the operation data sent by the Boot Loader in the memory (SOL Buffer) of the management system.

The first serial port through which the Boot Loader communicates with the management system can be SOL (Serial over LAN).

In some embodiments, after the Kernel Init and Userspace Init in the target system successfully start, the operation data can be written into the memory of the target system.

In the present disclosure, collecting the operation data of the at least one sub-module of the target system according to the first target path can include determining a data collection path of the target memory, the first target path at least including the data collection path, after the target module starts successfully, the target module writing the operation data of the sub-module into the target memory corresponding to the target module, and collecting the operation data of the at least one sub-module stored in the target memory through the data collection path. The target memory can belong to the management system or the target system.

If the target memory belongs to the management system, the data collection path of the target memory can be an internal transfer path of the management system.

If the target memory belongs to the target system, the data collection path of the target memory can be USB over LAN.

The management system can include a data collection module. The data collection module can collect the operation data of the target memory through the data collection path of the target memory. The target memory corresponding to the Boot Loader can be SOL suffer of the management system. The target memory corresponding to the Kernel Init and the Userspace Init can be System RAM.

In embodiments of the present disclosure, if the management system needs to collect the operation data of the Boot Loader, the data collection module of the management system can be configured to collect the operation data stored in the SOL Buffer of the management system through the internal transfer path. If the management system needs to collect the operation data of the Kernel Init and Userspace Init, the data collection module of the management system can send a data collection request to the data collection service of the target system via USB over LAN. The data collection service of the target system can obtain the operation data of the Kernel Init and the Userspace Init from the System RAM according to the request and send the operation data to the data collection module of the management system via USB over LAN.

In the present disclosure, the operation data of the target system can be automatically collected through the data collection module in the management system to improve the efficiency of processing and analyzing the target system.

In the present disclosure, after the management system collects the operation data of the target modules, the operation data can be sorted according to the startup time of the operation data to obtain the target dataset. Before the target dataset is output, the target dataset can be stored in the external storage space of the management system.

The external storage space can include a second serial port for downloading the target dataset. The user can download the target dataset from the external storage space through a second serial port of the management system.

In some embodiments, the external storage space can refer to an FFDC disk that stores data in the management system.

In some embodiments, if the user needs to obtain the data in the external storage space, the management system outputting the target dataset can include, in response to a query command corresponding to the target dataset, outputting the target dataset based on the second target path corresponding to the query command.

In some embodiments, the user can issue the query command through a user interaction module of the management system or the user interaction module of the target system. If the query command is issued by the management system, the target dataset in the external storage space can be output via the second serial port. If the query command is issued by the target system, the target dataset in the external storage space can be output to the data analyzer of the target system via USB over LAN. The data analyzer in the target system can be a platform for the target system to provide the data query to the user.

In embodiments of the present disclosure, the management system can enable the target modules of the target system to cause the target system to be in the successful startup status after the target modules successfully start. The management system can collect the operation data of the sub-modules of the target modules, sort the collected operation data according to the startup time represented by the operation data, and obtain the target dataset. The management system can store the target dataset in the external storage space. If the user sends the query command corresponding to the target dataset through the management system, the target dataset can be output through the second serial port of the management system. If the user sends the query command through the data analyzer of the target system, the management system can transfer the target dataset to the data analyzer of the target system via USB over LAN.

Figure 2:
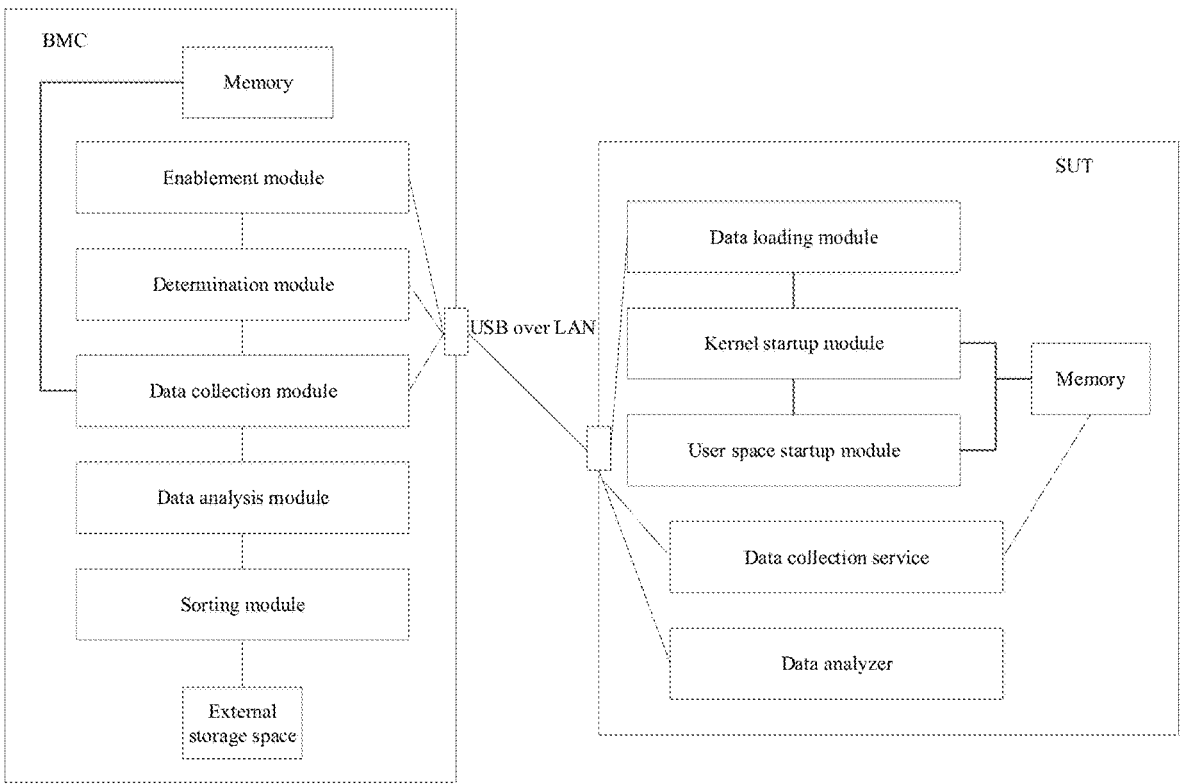
FIG. 2 illustrates a schematic block diagram of a management system and a target system according to some embodiments of the present disclosure.

Based on the method above, FIG. 2 illustrates a schematic block diagram of the management system and the target system according to some embodiments of the present disclosure. The management system (BMC) includes an enablement module (Profiling Enablement Module), a determination module (System Monitoring Module), a data collection module (Collect profiling data), a data analysis module (Profiling Analyzer), a sorting module, memory (SOL Buffer), and external storage space (FFDC). The target system (SUT) includes Boot Loader, Kernel Init, Userspace Init, a data collection service, a data analyzer, and system memory (System RAM). The management system and the target system are connected via USB over LAN. The enablement module of the management system sends an enable signal to the target system via USB over LAN. After the Boot Loader successfully starts according to the enable signal, Boot Loader sends the operation data of the sub-modules of Boot Loader to the SOL Buffer of the management system via SOL. After Kernel Init and Userspace Init successfully start, Kernel Init and Userspace Init write the operation data of the sub-modules of Kernel Init and Userspace Init into the System RAM. After the determination module detects that Userspace Init successfully starts, the data collection module of the management system can collect the operation data of SOL Buffer through the internal path and also send the data collection command to the data collection service of the target system via USB over LAN. The data collection service can return the operation data to the data collection module according to the original path. The data analysis module has performed analysis on the collected operation data to determine the startup time of each sub-module. The sorting module can sort the operation data according to the startup time to obtain the target dataset. The target dataset can be stored in FFDC. When the user requests to obtain the target dataset from the management system, the management system can output the target dataset through the second serial port of FFDC. When the user requests to obtain the target dataset from the target system, the management system can send the target dataset to the data analyzer of the target system via USB over LAN. The data analyzer can output the target dataset for the user.

In the data processing method of embodiments of the present disclosure, the management system can enable the target system, and the operation data of the target system can be automatically collected and analyzed. The whole process may not require manual intervention, which improves the processing efficiency of the target system.

The implementation process and derivative methods of embodiments of the present disclosure should be within the scope of the present disclosure.

Figure 3:
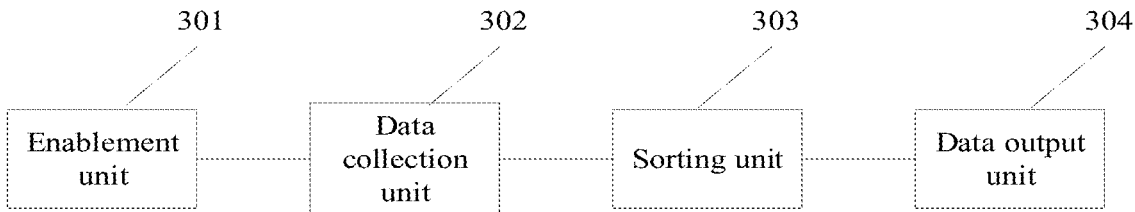
FIG. 3 illustrates a schematic structural diagram of a data processing apparatus according to some embodiments of the present disclosure.

Corresponding to the method shown in FIG. 1, embodiments of the present disclosure also provide a data processing apparatus, which is configured to implement the method in FIG. 1. The data processing apparatus of embodiments of the present disclosure can be applied to a computer terminal or various mobile devices. FIG. 3 illustrates a schematic structural diagram of the data processing apparatus according to some embodiments of the present disclosure. The data processing apparatus includes an enablement unit 301, a data collection unit 302, a sorting unit 303, and a data output unit 304.

The enablement unit 301 can be configured to enable the target modules of the target system. The target modules can be operation modules configured to start the target system.

The data collection unit 302 can be configured to collect the operation data of the at least one sub-module in the target system according to a first target path when the target system is in the successful startup status. The sub-module can be a sub-module of the target module. The sub-module can be configured to execute a part or all of the program in the target module, to which the sub-module belongs. The first target path can at least include a USB over LAN.

The operation data can be at least used to represent the startup time of the sub-module.

The sorting unit 303 can be configured to sort the collected operation data according to the startup time of the operation data to obtain the target dataset.

The data output unit 304 can be configured to output the target dataset.

In embodiments of the present disclosure, the enablement module 301 can enable the target modules of the target system. The enablement module 301 can be configured to send the enable signal to the target system via the USB over LAN to cause the target modules to execute the programs belonging to the target modules based on the enabling signal.

In embodiments of the present disclosure, the target modules of the target system can at least include a data loading module, a kernel startup module, and a user space startup module.

The data processing apparatus can further include a determination unit. The determination unit can be configured to determine that the target system is in the successful startup status when the user space startup module successfully starts.

In embodiments of the present disclosure, the data processing apparatus can further include a first storage unit. The first storage unit can be configured to, in response to the data transfer command corresponding to the data loading module of the target system, obtain the operation data of the sub-module of the data loading module sent by the data loading module through the first serial port. The operation data of the sub-module of the data loading module can be stored in the memory of the management system.

In embodiments of the present disclosure, the data collection unit 302 can collect the operation data of the at least one sub-module of the target system according to the first target path. The data collection unit 302 can be configured to determine the data collection path of the target memory. The first target path can at least include the data collection path. After the target module successfully starts, the target module can write the operation data of the sub-module into the target memory corresponding to the target module.

The operation data of the at least one sub-module stored in the target memory can be collected through the data collection path.

In embodiments of the present disclosure, the data collection unit 302 can determine the data collection path of the target memory.

The data collection unit 302 can be configured to, if the target memory belongs to the management system, determine the data collection path of the target memory as the internal transfer path of the management system, and if the target memory belongs to the target system, determine the data collection path of the target memory as the USB over LAN.

In embodiments of the present disclosure, the data processing apparatus can further include a second storage unit. The second storage unit can be used to store the target dataset in the external storage space of the management system. The external storage space can include the second serial port configured to download the target dataset.

In embodiments of the present disclosure, the data output unit 304 can output the target dataset. The data output unit 304 can be configured to in response to the query command corresponding to the target dataset, output the target dataset based on the second target path corresponding to the query command.

In embodiments of the present disclosure, the data output unit 304 can output the target dataset based on the second target path corresponding to the query command. The data output unit 304 can be configured to, if the query command is a command sent by the management system, output the target dataset of the external storage space through the second serial port, and if the query command is a command sent by the target system, output the target dataset of the external storage space to the data analyzer of the target system via USB over LAN.

For the operation processes of the units and sub-units of the data processing apparatus of embodiments of the present disclosure, reference can be made to the corresponding content of the data processing method of embodiments of the present disclosure, which are not repeated here.

Embodiments of the present disclosure further provide a storage medium. The storage medium can include a stored command. When the command is executed, the data processing method can be executed on the device.

Figure 4:
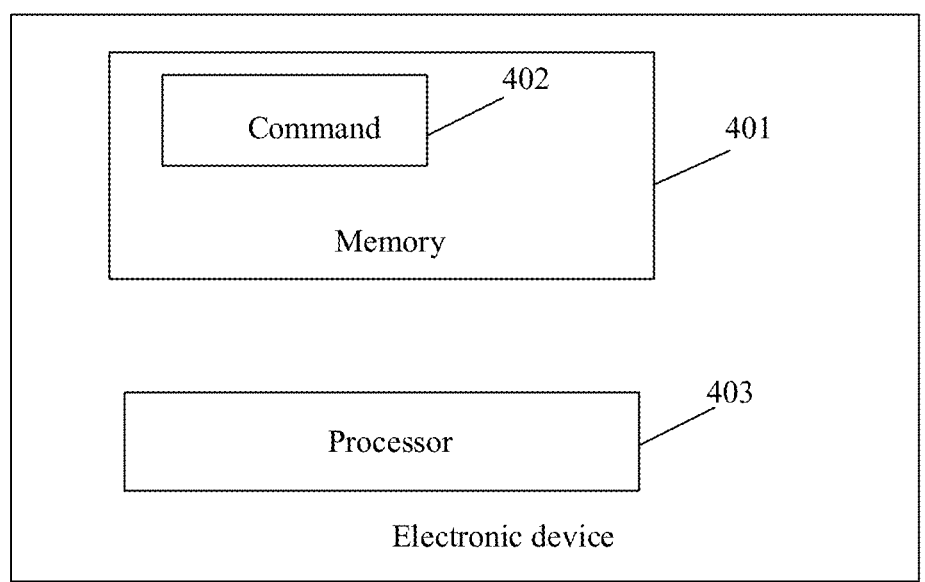
FIG. 4 illustrates a schematic structural diagram of an electronic device according to some embodiments of the present disclosure.

Embodiments of the present disclosure further provide an electronic device. As shown in FIG. 4, the electronic device includes a memory 401, one or more commands 402, and one or more processors 403. The one or more commands 402 are stored in the memory 401. When the one or more commands 402 are executed by the one or more processors 403, the one or more processors 403 can be configured to enable the target modules of the target system, when the target system is in the successful startup status, collect the operation data of the at least one sub-module of the target system according to the first target path, sort the collected operation data according to the startup time of the operation data to obtain the target dataset, and output the target dataset. The target module can be the operation module for starting the target system. The sub-module can be configured to execute a part or all of the program of the target module, to which the sub-module belongs. The first target path can at least include USB over LAN. The operation data can be at least used to represent the startup time of the sub-module.

Embodiments of the specification are described in a progressive manner. The same or similar parts between embodiments can refer to each other. Each embodiment focuses on the differences from the other embodiments. Since the system or system embodiments are fundamentally similar to the method embodiments, the system or system embodiments are simply described. For the relevant parts, reference can be made to a part of the description of the method embodiments. The above-described system and system embodiments are merely illustrative. The units described as separate members can be or cannot be physically separated. The member shown as a unit can be or may not be a physical unit. That is, the member shown as a unit can be located at one place or distributed at a plurality of network units. The solution of embodiments of the present disclosure can be implemented by selecting some or all modules as needed. Those skilled in the art can understand and implement the solution of the present disclosure without creative efforts.

Those skilled in the art can further understand that the units and algorithm steps described in embodiments of the present disclosure can be implemented by electronic hardware, computer software, or a combination thereof.

To describe the interchangeability of the hardware and software, the structures and steps of the described embodiments are functional-generally described in the specification. Whether the function is executed by the hardware or software depends on the specific application and design constraints of the technical solution. Those skilled in the art Moreover, professionals can further recognize that the units and algorithm steps described in the examples disclosed herein can be implemented in electronic hardware, computer software, or a combination of both. To clearly illustrate the interchangeability of hardware and software, the composition and steps of each example have been generally described in terms of functionality. Whether these functions are implemented as hardware or software depends on the specific application and design constraints of the technical solution. Those skilled in the art can use different methods to implement the described function for each specific application, which should not be considered as exceeding the scope of the present disclosure.

The above description of embodiments of the present disclosure can enable those skilled in the art to implement or use the present disclosure. Various modifications can be made to embodiments of the present disclosure and are obvious to those skilled in the art. The general principle defined in the specification can be implemented in other embodiments without departing from the spirit or scope of the present disclosure. Thus, the present disclosure is not limited to embodiments of the present disclosure but conforms to the widest scope consistent with the principle and novel features of the present disclosure.

What is claimed is:

1. A data processing method, applied to a management system, comprising:

enabling, by the management system, target modules of a target system, each target module of the target modules being an operation module for starting the target system;

in response to the target system being enabled by the management system in a successful startup status, collecting, by the management system, operation data of at least one sub-module in the target system according to a first target path, each sub-module of the at least one sub-module being configured to run a part or all of a program of a target module to which the sub-module belongs, the first target path at least including a data collection path of a target memory, the data collection path of the target memory being determined as an internal transfer path of the management system or being determined as a USB over LAN in response to a location of the target memory, and the operation data being at least used to represent startup time of the sub-module;

sorting the collected operation data according to the startup time to obtain a target dataset; and outputting the target dataset.

2. The method of claim 1, wherein enabling the target modules of the target system includes:

sending an enable signal to the target system through the USB over LAN to enable each target module of the target modules to execute the program belonging to the target module in sequence based on the enable signal.

3. The method of claim 2, wherein the target modules of the target system at least include a data loading module, a kernel startup module, and a user space startup module, the method further comprising:

in response to detecting that the user space startup module being successfully started, determining that the target system is in the successful startup status.

4. The method of claim 3, further comprising:

in response to a data transfer command corresponding to the data loading module of the target system, obtaining operation data of a sub-module within the data loading module sent by the data loading module via a first serial port, the operation data of the sub-module of the data loading module being stored in memory of the management system.

5. The method of claim 1, wherein collecting the operation data of the at least one sub-module in the target system according to the first target path includes:

determining the data collection path of the target memory, the operation data of the submodules being written to the corresponding target memory of the target module after the target module is successfully started; and collecting the operation data of the at least one sub-module stored in the target memory through the data collection path.

6. The method of claim 5, wherein determining the data collection path of the target memory includes:

in response to the target memory belonging to the management system, determining the data collection path of the target memory as the internal transfer path of the management system; and in response to the target memory belonging to the target system, determining the data collection path of the target memory as the USB over LAN.

7. The method of claim 1, further comprising:

storing the target dataset in an external storage space of the management system, the external storage space including a second serial port for downloading the target dataset.

8. The method of claim 7, wherein outputting the target dataset includes:

in response to a query command corresponding to the target dataset, outputting the target dataset based on a second target path corresponding to the query command.

9. The method of claim 8, wherein outputting the target dataset based on the second target path corresponding to the query command includes:

in response to the query command being issued by the management system, outputting the target dataset from the external storage space via the second serial port; and in response to the query command being issued by the target system, outputting the target dataset from the external storage space to a data analyzer of the target system via the USB over LAN.

10. A data processing apparatus, applied to a management system, comprising:

an enablement unit of the management system configured to enable target modules of a target system, each target module of the target modules being an operation module for starting the target system;

a data collection unit of the management system configured to, in response to the target system being enabled by the management system in a successful startup status, collect operation data of at least one sub-module in the target system according to a first target path, each sub-module of the at least one sub-module being configured to run a part or all of a program of a target module to which the sub-module belongs, the first target path at least including a data collection path of a target memory, the data collection path of the target memory being determined as an internal transfer path of the management system or being determined as a USB over LAN in response to a location of the target memory, and the operation data being at least used to represent startup time of the sub-module;

a sorting unit configured to sort the collected operation data according to the startup time to obtain a target dataset; and a data output unit configured to output the target dataset.

11. A non-transitory computer-readable storage medium storing programs that, when executed by one or more processors, cause the one or more processors to perform a data processing method applied to a management system, wherein the one or more processors are configured to:

enable target modules of a target system, each target module of the target modules being an operation module for starting the target system;

in response to the target system being enabled by the management system in a successful startup status, collect operation data of at least one sub-module in the target system according to a first target path, each sub-module of the at least one sub-module being configured to run a part or all of a program of a target module to which the sub-module belongs, the first target path at least including a data collection path of a target memory, the data collection path of the target memory being determined as an internal transfer path of the management system or being determined as a USB over LAN in response to a location of the target memory, and the operation data being at least used to represent startup time of the sub-module;

sort the collected operation data according to the startup time to obtain a target dataset; and output the target dataset.

12. The computer-readable storage medium of claim 11, wherein the one or more processors are further configured to:

send an enable signal to the target system through the USB over LAN to enable each target module of the target modules to execute the program belonging to the target module in sequence based on the enable signal.

13. The computer-readable storage medium of claim 12, wherein the target modules of the target system at least include a data loading module, a kernel startup module, and a user space startup module, the one or more processors are further configured to:

in response to detecting that the user space startup module being successfully started, determine that the target system is in the successful startup status.

14. The computer-readable storage medium of claim 13, wherein the one or more processors are further configured to:

in response to a data transfer command corresponding to the data loading module of the target system, obtain operation data of a sub-module within the data loading module sent by the data loading module via a first serial port, the operation data of the sub-module of the data loading module being stored in memory of the management system.

15. The computer-readable storage medium of claim 11, wherein the one or more processors are further configured to:

determine the data collection path of the target memory, the operation data of the submodules being written to the corresponding target memory of the target module after the target module is successfully started; and collect the operation data of the at least one sub-module stored in the target memory through the data collection path.

16. The computer-readable storage medium of claim 15, wherein the one or more processors are further configured to:

in response to the target memory belonging to the management system, determine the data collection path of the target memory as the internal transfer path of the management system; and in response to the target memory belonging to the target system, determine the data collection path of the target memory as the USB over LAN.

17. The computer-readable storage medium of claim 11, wherein the one or more processors are further configured to:

store the target dataset in an external storage space of the management system, the external storage space including a second serial port for downloading the target dataset.

18. The computer-readable storage medium of claim 17, wherein the one or more processors are further configured to:

in response to a query command corresponding to the target dataset, output the target dataset based on a second target path corresponding to the query command.

19. The computer-readable storage medium of claim 18, wherein the one or more processors are further configured to:

in response to the query command being issued by the management system, output the target dataset from the external storage space via the second serial port; and in response to the query command being issued by the target system, output the target dataset from the external storage space to a data analyzer of the target system via the USB over LAN.

* * * * *